Patented Dec. 14, 1943

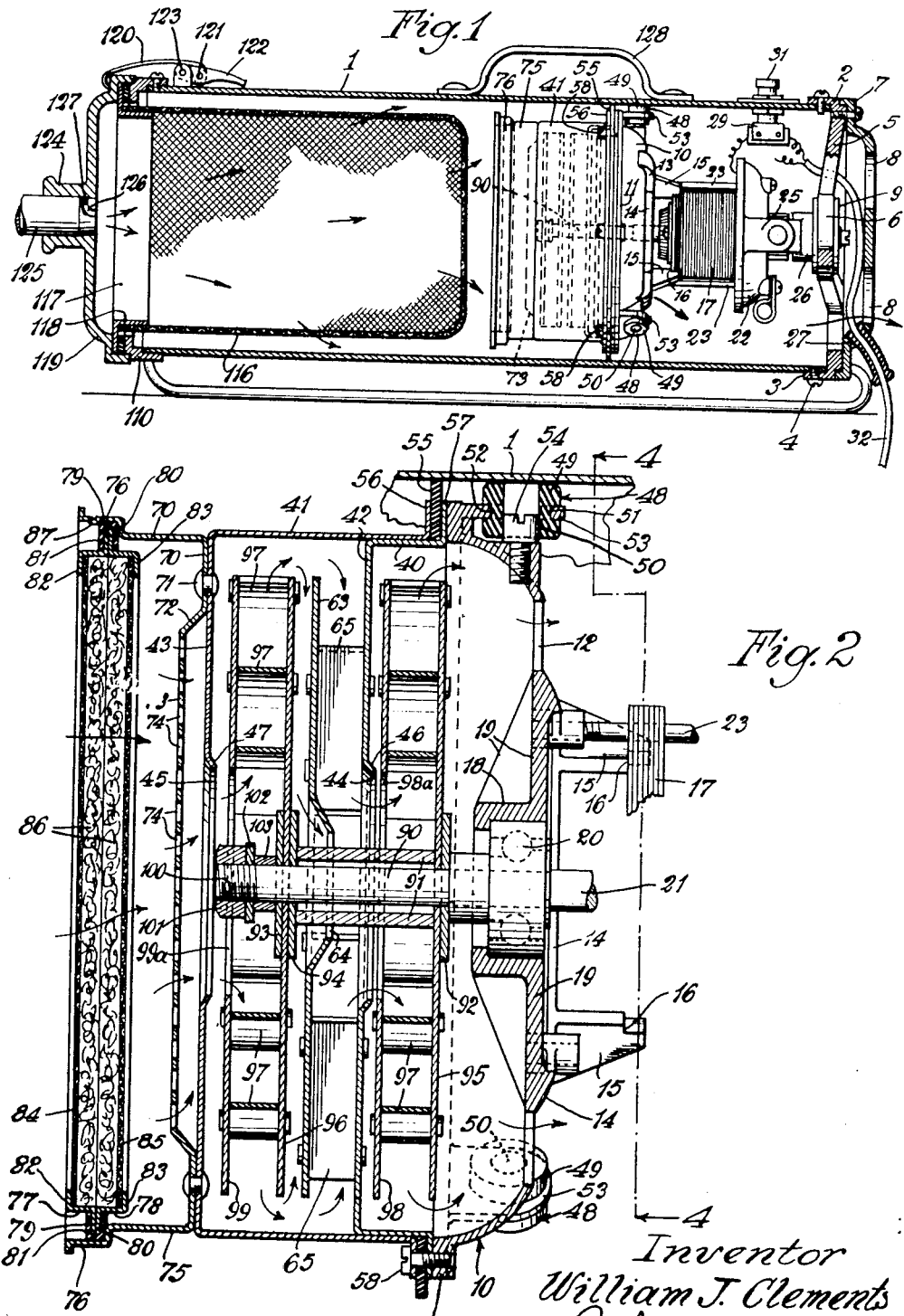

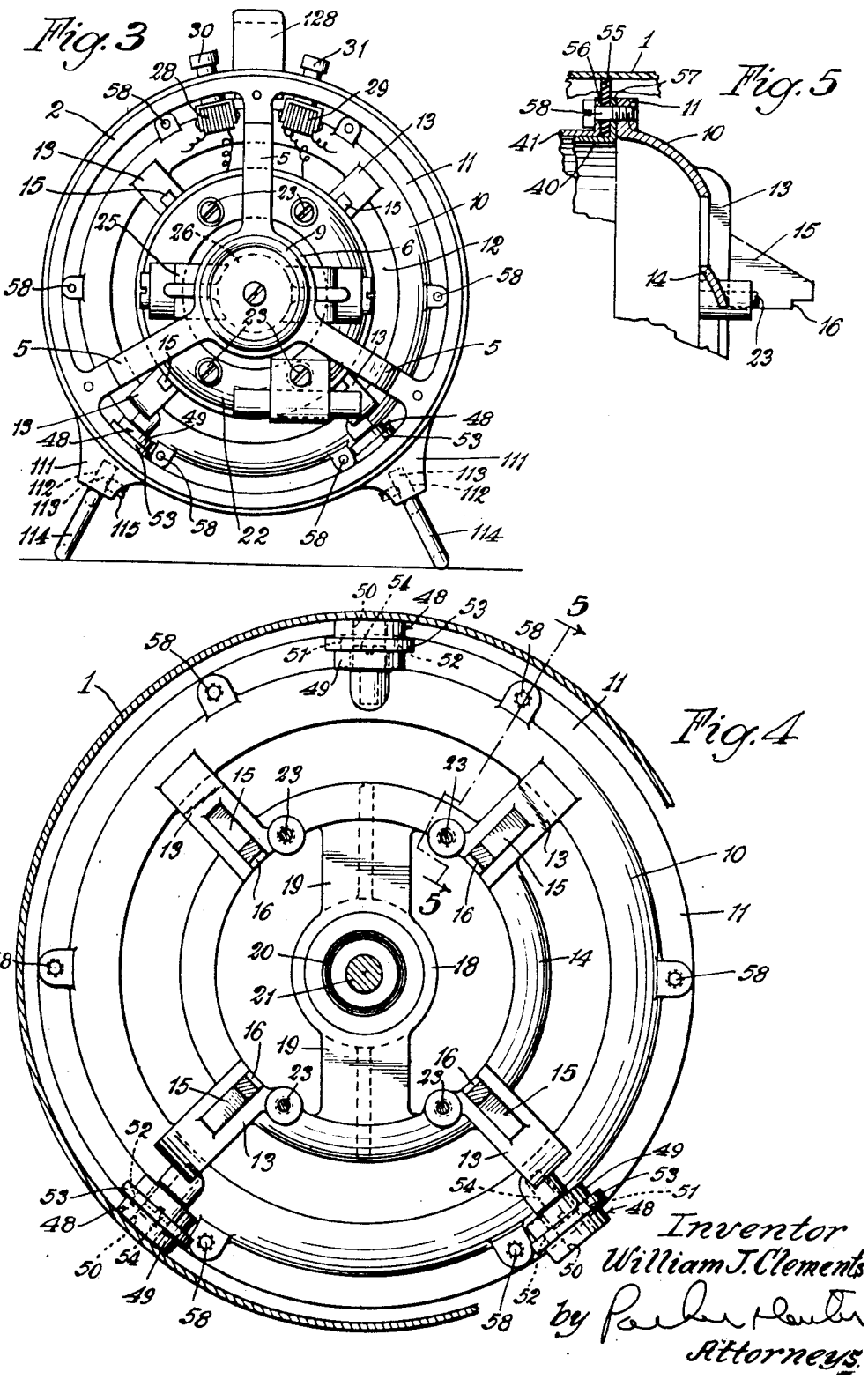

2,336,716

UNITED STATES PATENT OFFICE 2,336,716

SUPPORTING MEANS FOR THE MOTOR AND FAN ASSEMBLY OF TANK TYPE CLEANERS

William J. Clements, Chicago, Ill., assignor to Clements Mfg. Co., Chicago, Ill., a corporation of Illinois Application January 8, 1942, Serial No. 425,976

6 Claims. (Cl. 230—117)

My invention relates to an improvement in vacuum cleaners.

One purpose is the provision of an improved vacuum cleaner of the type in which the dust bag, motor and fan are enclosed within a housing.

Another purpose is the provisions of an improved fan and motor unit for use in such housing.

Another purpose is the provision of a fan and motor unit which can be unitarily removed from such a housing.

Other purposes will appear from time to time in the course of the specification and claims.

I illustrate my invention more or less diagrammatically in the accompanying drawings wherein:

Fig. 1 is a longitudinal section of a cleaner casing with some of the mechanism in side elevation;

Fig. 2 is a sectional view of the strainer and fan parts;

Fig. 3 is a rear elevation with back cover removed;

Fig. 4 is a section on the line 4—4 of Fig. 2, on a reduced scale; and

Fig. 5 is a section on an enlarged scale on the line 5—5 of Fig. 4.

Like parts are indicated by like symbols throughout the specification and drawings.

Referring to the drawings, I generally indicates a tubular or cylindrical housing, which has at one end a ring 2, including a flange portion 3 which fits about the exterior of one end of the housing 1. 4 indicates any suitable screws or other securing means whereby the ring may be secured to the housing. 5 indicates a spider structure extending generally radially inwardly from the ring and supporting the inner hub 6, herein shown as unitary with the spider and ring.

7 is any suitable removable covering or cap having any suitable air outlet apertures 8. 9 is a ring of rubber or the like set within a central aperture of the hub 6. 10 generally indicates a shield or ring having a circumferential flange 11 and a central air aperture 12, which element forms part of the fan assembly. Extending inwardly from the inner edge of the ring 10 are supports 13, which carry an inner ring 14, which extend inwardly in the form of ribs, as at 15, and are provided with ledge abutments 16, which receive the motor field laminations 17. The bearing sleeve 18 is mounted upon inwardly extending arms 19 unitary with the above described structure. Any suitable anti-friction bearings 20 may be mounted in the sleeve 18 to support the motor shaft 21, which carries any suitable motor armature rotating within the field laminations 17.

22 is an abutment ring abutting against the opposite end of the group of field laminations 17. Any suitable means, for example bolts 23, may be employed for clamping it and for thereby holding the laminations 17 against the abutment ledges 16 of the members 15. The ring 22 also is adapted to support any suitable brushes as upon the bridge 25, which brushes cooperate with the commutator of the motor. 26 is a generally cylindrical outer extension of the bridge 25, which penetrates the central aperture within the rubber sleeve 9.

Any suitable switch structure may be used, generally indicated as 28, 29, the details of which do not of themselves form part of the present invention. I illustrate, however, two separate outwardly extending manually manipulatable switch members 30, 31. 32 indicates any suitable conductive line extending to any suitable source of electric power not herein shown.

Mounted upon the flange 11 of the ring 10 is a fan housing structure, which includes two nesting cylindrical housing members 40, 41, carrying inwardly extending partition walls 42, 43, each centrally apertured as at 44, 45, the central aperture being bordered by an inturned lip 46, 47. The two members 40, 41 are secured as shown in Fig. 2. They provide a fan housing separated into two main compartments. In order to support the ring 10 for ready endwise removal from the housing 1, I provide a plurality of slidable abutments 48, preferably but not necessarily of rubber or other suitable yielding material. I illustrate them as in the form of rubber tubes or bodies 49, having central apertures 50 and an outer circumferential channel 51 adapted to be received in an aperture 52 in a flange 53, which may be unitary with the ring 10. Any suitable securing means, such as a screw 54, may be employed, if necessary, to hold the members 49 from unintended removal. The space between the periphery of the ring 10 and the housing 1 may be sealed by a flexible ring 55, which may be held between the flanges 56 and 57 of the members 40, 41, by any suitable securing means, such as screws 58.

Mounted on one face of the wall 42, I provide an additional partition 63, the outer edge of which terminates short of the inner face of the member 41. This partition is centrally apertured as at 64 and carries a plurality of fixed vanes 65, preferably somewhat inclined from the radial.

Mounted on the outer face of the partition wall 43 is an air filter assembly, which includes the ring 70, which may be riveted as at 71 to the wall 43. The ring 70 is provided with an inclined portion or ledge 72 and an intermediate portion 73, provided with air inlets 74. The ring 70 carries at its outer edge the unitary cylindrical wall 75 having a ledge 76 adapted to receive a filter structure, including rings 77, 78, having abutting outwardly extending flanges 79, 80, secured together as by an enveloping circumferential rubber ring 81, generally U-shaped in cross section. Inwardly extending flanges 82, 83 embrace any suitable filter structure, which may be formed by layers of mesh 84, 85, with any suitable intermediate packing confined therebetween. The filter ring may be locked in position as by the inwardly offset portions 87.

The motor shaft 21 is shown as having an extension 90 into the fan housing. It may be positioned in relation to the bearing 20 in any suitable manner. I illustrate a hub structure, including a sleeve 91, with spacing washers 92, 93, and 94. Mounted on the shaft extension 90 and spaced by the sleeve 91, are fan discs 95, 96, each carrying a plurality of arcuate vanes 97, which support rings 98, 99, apertured at 98a and 99a. The inner ends of the shaft extension 90 is screw threaded as at 100 and receives a locking nut 101, abutting against a washer 102 and a sleeve 103, the fan disc 96 being confined between the washers 93 and 94.

It will be observed, as in Fig. 2, that, in response to the rotation of the motor and of the fan structure, air is drawn inwardly in the direction of the arrows through the filter and the foraminous plate 73. Air then passes through the aperture 45 and into the first fan, being directed outwardly toward the inner face of the wall 41. It then passes inwardly along the fixed baffles 65 through the central aperture 64, and also about the edge of the baffle 63, and is then directed outwardly by the second fan. Air is deflected by the ring 10 and passes about the above described motor structure and then upwardly through the spider 5 to the air outlet passage 8, thus cooling the motor.

It will be noted that the entire fan and motor assembly can be readily and unitarily removed from the housing 1 by simply releasing the screws 4 and the below described runner structure.

Another ring 110 is mounted at the opposite end of the housing. The rings 2 and 110 are both provided with outwardly extending lugs 111, which may be apertured as at 112 to receive the recurved upbent ends 113 of any suitable runner structures 114. 115 indicate locking set screws in the lugs 111 adapted to lock the runners in place.

116 is any suitable bag structure having an open end 117 and any suitable supporting ring 118 abutting against a portion of the ring 110, with a rubber gasket ring between. 119 is any suitable closure which may be locked in position, for example by a plurality of locking hooks 120 pivoted as at 121 on the locking lever 122, which is pivoted at 123 on the casing 1. The closure 119 is provided with a centrally apertured sleeve 124 adapted to receive any suitable suction inlet or hose connection 125, which is provided with a bayonet slot 126 adapted to receive any suitable locking pin 127. 128 is any suitable carrying handle secured to the top of the housing 1.

It will be observed that the housing cap 7 is apertured as at 27 to permit the entry of the conductive connection 32. The relation between the aperture and the conductive connection is such that the cap 7 can be removed without disturbing the conductive connection. The switch structure 28, 29, 30, 31 may also be readily disconnected from the housing 1 and withdrawn with the unit in order to prevent any impediment to the endwise outward movement of the motor and fan assembly.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a unitary open-ended tubular housing 1, to which the opposite ends of the rings 2 and 110 are applied and from which they may be readily removed if necessary. Air flows inwardly through the hose connection 125 from any suitable suction nozzle not herein shown. This air, filled with dirt, flows into the interior of the bag 116 and is constrained to flow through the fabric or mesh of which the bag is formed, there depositing the dust or dirt which it carried. The air then flows through the filter structure, which includes the fibrous material 86. The members or bodies 48 serve as a vibration preventing support for the inner end of the motor-fan unit, and the other end is supported in the rubber ring 9. However, since the rubber ring 9 is supported upon the ring 2 and its associated spider structure, and since the bodies 48 are slidable in relation to the housing 1, the entire motor and fan unit, although readily removable, is also sufficiently supported in a vibration preventing relationship to the housing 1.

I claim:

1. In a vacuum cleaner, an exterior housing substantially cylindrical from end to end, and means for normally supporting it in a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing but readily slidable along the inner face of the housing when the motor and fan assembly is removed, and a sliding sealing connection between said ring and the face of the housing, said supporting connections including slotted lugs on said ring and buttons of yielding material channeled to penetrate said slots.

2. In a vacuum cleaner, an exterior housing substantially cylindrical from end to end, and means for normally supporting it in a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing but readily slidable along the inner face of the housing when the motor and fan assembly is removed, and a sliding sealing connection between said ring and the face of the housing, said supporting connections including slotted lugs on said ring and buttons of yielding material channeled to penetrate said slots, and securing means adapted to secure said buttons in said slots in relation to the ring.

3. In a vacuum cleaner, an exterior housing substantially cylindrical from end to end, and means for normally supporting it in a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing but readily slidable along the inner face of the housing when the motor and fan assembly is removed, and a sliding sealing connection between said ring and the face of the housing, said supporting connections including circumferentially spaced bodies of yielding material mounted on said ring.

4. In a vacuum cleaner, an exterior housing substantially cylindrical from end to end, and means for normally supporting it in a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing when the motor and fan assembly is removed, and a sliding sealing connection between said ring and the face of the housing, said supporting connections including circumferentially spaced bodies of yielding material mounted on said ring closely adjacent but out of contact with said sliding sealing connection.

5. In a vacuum cleaner, an exterior housing substantially cylindrical from end to end, and means for normally supporting it in a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing when the motor and fan assembly is removed, and a sliding sealing connection between said ring and the face of the housing, said supporting connections including circumferentially spaced bodies of yielding material mounted on said ring, and means for readily removably securing them thereto.

6. In a vacuum cleaner, an exterior housing substantially cylindrical from end to end, and means for normally supporting it is a generally horizontal position, a motor and fan assembly insertable directly into the discharge end of the housing, said motor and fan assembly including a ring removably engaging the outer edge of the discharge end of the housing, a frame element for the motor, including a frame ring adjacent but out of contact with the inner face of the housing, said ring including a central hub having bearing means for the rotor shaft of the motor, a fan housing secured to said ring, centering and supporting connections between an outer portion of said ring and the inner face of the housing, circumferentially spaced about said ring, and adapted to center the ring in relation to the housing when the motor and fan assembly is removed, a thin, freely flexible sealing ring, mounted on the frame ring, and having an outer free edge in wiping engagement with the opposed inner wall of the housing, the sealing ring being sufficiently flexible to provide substantially no effective resistance to relative endwise movement of the housing and the motor and fan assembly.

WILLIAM J. CLEMENTS.